United States Patent Office 3,126,432
Patented Mar. 24, 1964

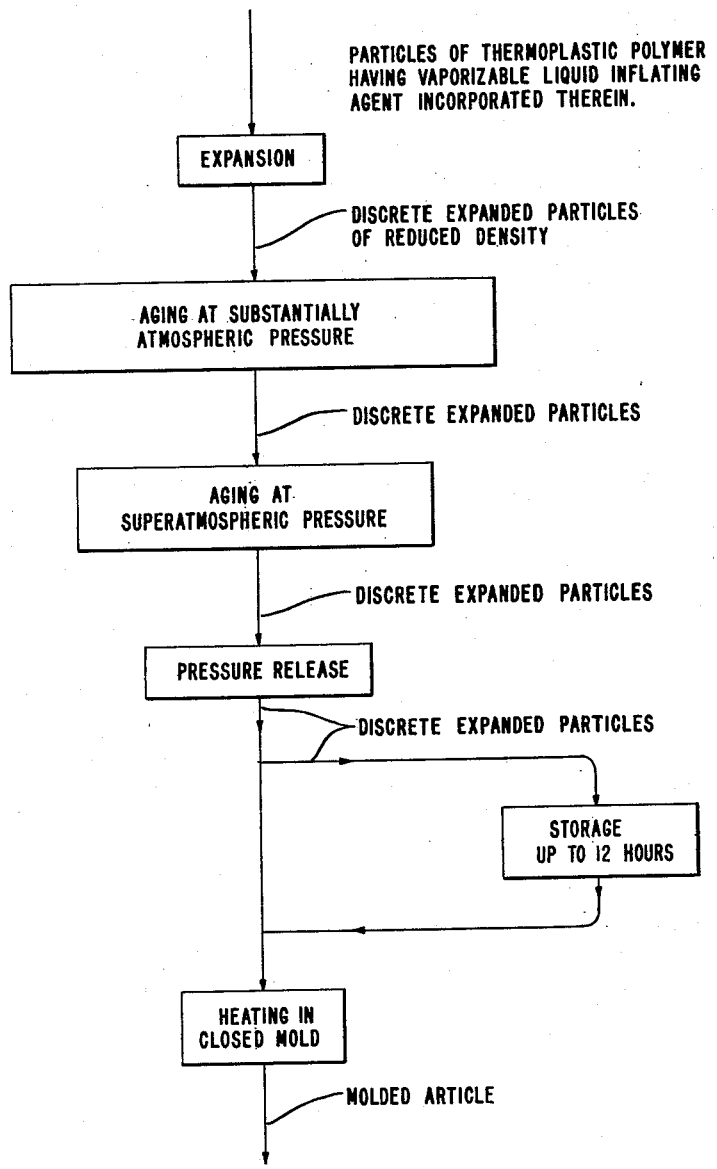

3,126,432
PROCESS FOR PRODUCTION OF SUPER-LOW DENSITY THERMOPLASTIC FOAM
Gerrit Schuur, Delft, Netherlands, assignor to Shell Oil Company, New York, N.Y., a corporation of Delaware
Filed Apr. 26, 1962, Ser. No. 190,243
Claims priority, application Netherlands May 18, 1961
3 Claims. (Cl. 264—53)

The invention relates to a method of manufacturing from a thermoplastic material shaped articles having a predominantly closed foam structure.

It is known that such articles may be manufactured from fine particles of a thermoplastic material, especially polystyrene obtained by the known suspension-polymerization of styrene in the form of granules or globules containing an inflating agent, for example butane, pentane or similar volatile hydrocarbons, by placing the said particles in a closed mold and heating them therein above the softening point of the thermoplastic material. The articles thus obtained have a cellular structure with substantially closed pores and are suitable for many purposes, for example for packing thermal insulation and the like.

Although possible, it is not usual for the still unexpanded polymer particles containing foaming agent to be directly introduced into the mold, as in practice it is preferred first to pre-expand the expandable polymer particles (so-called "pre-foaming"), this process usually being carried out by heating the polymer particles with steam or hot water for a short time. After this pre-foaming, during which there is a considerable increase in the volume of the particles, the pre-foamed particles are first stored for some time and not placed in the mold until afterwards. This storage, known as ageing of the pre-expanded particles, which usually lasts at least 12 hours and often much longer, is a necessity as otherwise the molding, which is effected by heating the prefoamed polymer parts in a closed mold, for instance by means of steam, and in which the said particles are as it were cemented together, produces articles having unsatisfactory mechanical properties and appearance.

Starting from expandable polystyrene granules, shaped articles, for example sheets and the like with a foam structure may be manufactured which have a density of about 15 to 20 grams per liter and a good appearance and satisfactory mechanical properties. Although it is possible to reduce the density still further, for instance to approximately 9 grams per liter, by again pre-expanding the pre-expanded polystyrene particles after ageing, in the final molding process polystyrene granules of such a low density are very liable to exhibit shrinking phenomena, and this results in undesirable deformations and an unattractive appearance.

The invention now provides a method by which a thermoplastic material can be manufactured from which shaped articles may be prepared which have a foam structure of particularly low density, for example less than 10 grams per liter, as well as good mechanical properties and a good appearance.

The invention will be better understood by reference to the drawing, in which the sole figure is a schematic representation of the steps employed in the process of the invention.

It is an object of the invention to provide an improved process for the production of thermoplastic foams. It is a particular object of the invention to provide a process which avoids the undesirable shrinkage of the foamed body. Other objects will become apparent during the following description of the invention.

Now, in accordance with the present invention, an improved foam molding process comprises that in which pre-foamed particles of a thermoplastic material, for example polystyrene, are first aged for some time at atmospheric or substantially at atmospheric pressure and then at elevated gas pressure, for instance 1.5 atms., or higher, and the final working up into shaped articles takes place before the superatmospheric pressure in the pre-foamed, aged material is reduced to atmospheric pressure by permeation.

This method not only has the advantage that expandable polymer particles with an exceptionally low density of, for instance, 6 grams per liter of even less, may be used in molding shaped articles having good mechanical properties, no shrinking phenomena and an exceptionally good appearance, but also that the time required for ageing the pre-foamed particles can be considerably reduced, for instance from 12 hours to a total of 6 hours or even less.

An important advantage of the present method is that whereas in the case of pre-foamed polymer particles which have only been aged at atmospheric pressure the mold or matrix used for manufacturing shaped articles has to be wholly or substantially wholly filled with the said particles, which is often difficult to achieve, this is not always necessary with the pre-foamed polymer particles which are aged with the use of elevated gas pressure. It has been found in fact, that excellent results are obtained with the latter even when the mold is only partly filled, for instance to 75% or even less, since during the heating of the mold the polymer particles still expand sufficiently to fill the entire mold and good cementation of the said particles is possible, the final products having a lower density than the bulk density of the pre-foamed polymer particles used as starting material. Surprisingly the very thin cell walls of the pre-foamed particles also remain intact when aged at pressures, of for instance, 3 to 8 atmospheres.

It is manifest that the advantage of partially filling the mold is of special importance in the manufacture of articles of a complex shape requiring difficult matrixes which are very troublesome to fill completely with the pre-foamed material. The possibility of partial filling of a matrix obviously also results in a saving of thermoplastic material. When the molds are completely filled the advantage of the present method is often shown by sharper detail and smoother surface of the shaped articles.

A further advantage of the method of the invention is that the shaped articles can often be manufactured more rapidly without the occurrence of undesirable shrinking phenomena, thereby reducing the cycle time of the method.

A gas pressure of about 2–8 atms. is preferably used for ageing the pre-foamed polymer particles at super-atmospheric pressure. If desired still higher pressures, for example 10 atms. or higher, may be used, but these are generally less attractive owing to the more expensive equipment required for resisting such pressures. The time of super-atmospheric ageing is usually in excess of 1 hour and is preferably 2–8 hours.

Although the pressure treatment may be carried out at constant or substantially constant elevated pressure, it may be preferable to raise the pressure gradually until the desired final pressure is reached; in this way, after being aged at atmospheric pressure the pre-foamed polymer particles may, for example, be successively subjected to a gas pressure of 1.5, 2 and 3 atms. for about half an hour and subsequently at 6 atms. for a further 1½ to 2 hours. Such a gradual pressure increase is not essential, except with pre-foamed material of very low densities.

The pressure treatment, and the preceding ageing of the pre-expanded particles at atmospheric pressure, are usually carried out at room temperature, that is at about 15–30° C. for at least one hour each. Lower temperatures (e.g. −10° C.) or elevated temperatures below the flow temperature of the thermoplastic may also be used, although this does not give any special advantages.

Before applying the pressure treatment the pre-foamed polymer particles should first be subjected to air-ageing for some time at atmospheric pressure. If this step is entirely omitted or not carried out long enough shaped articles are finally obtained which exhibit shrinking phenomena, as shown both by the poor appearance and a density which is higher than the bulk density of the pre-foamed material. The time required may vary within a fairly wide range, depending on the density of the pre-foamed material.

It has been found that the particles shrink when a pre-foamed material having a density of, for instance, 10 grams per liter, is subjected to a gas pressure of 6 atms. immediately after pre-foaming. Reducing the pressure to 1 atm. after the particles have been kept at 6 atms. for, say, 6 hours, results in incomplete expansion to the original volume. Shrinking also occurs, however, when the particles are aged at atmospheric pressure for 3 hours and then exposed to a gas pressure of 6 atms. but when the pressure is reduced to 1 atm. the particles expand to the original volume and can then be used for manufacturing shaped articles. In general, a method is preferred in which there is little or no shrinking of the particles during pressurizing. The pressure which may be applied increases with an increasing ageing time at atmospheric pressure. An ageing time of 1–3 hours at atmospheric pressure generally gives good results.

Although in the method according to the invention any desired gases, e.g., oxygen, nitrogen, carbon dioxide, helium, lower hydrocarbons (e.g., methane, ethane, propane) and halogenated hydrocarbons boiling below 20° C. are suitable for ageing at elevated pressure, air is preferred for reasons of economy. The use of a halogenated hydrocarbon such as monochlorodifluoromethane may sometimes be advantageous, viz., when there is some shrinking of the shaped articles in the mold with steam-heating; it was found that such shrinkage could be entirely and permanently eliminated by subsequently heating the article in air.

On completion of the pressure treatment the gas pressure applied to the polymer particles may be rapidly reduced to atmospheric pressure without any marked rupture of the cell walls. When air is used for the pressure treatment the resultant pre-foamed polymer particles are characterized in that their air content is higher than that required for equilibrium with air of atmospheric pressure.

If desired, after the pre-foamed particles have been aged at elevated pressure they may be subjected to a second pre-expansion treatment by means of a brief heating with steam or in hot water. Such a second pre-expansion, which may usually be shorter than the first, results in a further reduction in the density of the polymer particles than would have been obtained by a second pre-expansion without ageing at elevated pressure.

Ths second pre-expansion treatment should be followed by a second treatment with pressurized gas before shaped articles can be manufactured.

The pre-foamed and aged polymer particles obtained according to the invention slowly lose their internal gas pressure. It is therefore advisable for the said polymer particles to be used immediately for making shaped articles or at least within 1–3 hours after manufacture. If more than 12 hours have elapsed after the manufacture the pressure treatment has to be repeated. The pressured particles may be stored under super-atmospheric pressure in containers prior to molding for the purpose of inventory, shipment or sales.

The method of the invention is specially important for manufacturing shaped articles from expandable polystyrene, for example, polystyrene beads of the kind that may be obtained in a known manner by suspension polymerization of styrene. But the invention is not limited to this and may also be applied to waste obtained in the working up of foamed polystyrene after this has been reduced to particles of aproximately the same dimensions as prefoamed polystyrene beads, i.e., about 0.2–1 cm. The method may also be applied to styrene copolymers, e.g., styrene acrylonitrile copolymers, and to polystyrene flame-proofed by the addition of certain compounds such as chlorinated paraffin wax and antimony oxide.

The method according to the invention will be demonstrated in greater detail by the following examples.

EXAMPLE I

Expandable polystyrene in the form of small globules containing about 6% by weight of pentane as an inflating agent were pre-foamed with steam at 100° C. for about 15 minutes. The globules thus pre-foamed, the bulk density of which was 16 grams per litre, were first air-aged at atmospheric pressure for 4 hours and then in an autoclave at 2 atm. abs. for 2 hours, at 3 atm. abs. for 2 hours, and finally at 4 atm. abs. for 4 hours. The preformed material thus aged was then removed from the autoclave and used for making ice-cream boxes consisting of two practically identical parts of which the external dimensions were 17 x 12.5 x 8 cm. and the internal dimensions 12.5 x 9 x 5 cm.

To this end 1 hour after completion of the ageing at elevated pressure the pre-foamed material was placed in a mold in which it was heated with steam for 3 minutes at a pressure of 1.7 atm. abs. After a cooling time of 30 seconds the shaped box was removed from the mold. It has an excellent appearance and was entirely free from shrinking phenomena. When the pre-foamed material was worked up 10 hours after completion of the ageing at elevated pressure an entirely unacceptable article was obtained on shaping.

When the pre-foamed material was only air-aged at atmospheric pressure for 24 hours boxes were obtained which exhibited marked shrinking phenomena when the material was worked up under similar conditions.

EXAMPLE II

Two portions of pre-foamed polystyrene globules, one having a density of 10 grams per liter and the other of 6 grams per liter, were each aged at atmospheric pressure for varying periods and then subjected to an air pressure of 7 atm. abs. for 3 hours. Cylindrical articles were made from each of the samples thus aged by heating them in a closed mold with steam for 20 seconds at a pressure of 1.8 atm. abs. The density was determined of each of the articles obtained. The results are shown in the following table:

Table I

| Density of pre-foamed polystyrene | 10 g./l. | | | | | | 6 g./l. | | | |
|---|---|---|---|---|---|---|---|---|---|---|
| Air-ageing time at 1 atm. in minutes | 3 | 30 | 60 | 70 | 120 | 180 | 3 | 30 | 60 | 90 |
| Density of the shaped article, g./l. | 17 | 13.5 | 13 | 11.5 | 10 | 10 | 7 | 6.5 | 6 | 6 |

Only the shaped articles of which the pre-foamed material had been aged at atmospheric pressure for at least 120 and 60 minutes had satisfactory properties. These experiments show that for ageing at atmospheric pressure a certain minimum time is required which depends on the density of the pre-foamed material. This period, however, also depends on the conditions during shaping.

EXAMPLE III

Pre-foamed polystyrene globules having a density of 12 grams per liter, obtained by heating with steam of about 100° C. polystyrene globules containing approximately 6% by weight of pentane, were first air-aged at atmospheric pressure for 2 hours and subsequently for 3 hours in an autoclave at an air pressure of 7 atm. abs.

Cylindrical articles were made from the polystyrene globules thus aged, in one case the matrix being filled completely and in the other only 70%.

For the comparison, similar experiments were carried out with pre-foamed polystyrene globules prepared in the same way except that they were now aged only at atmospheric pressure for 24 hours.

The results obtained are shown in the following table:

Table II

| Method of Ageing | 2 hours in air; 3 hours at 7 atm. abs. | 2 hours in air; 3 hours at 7 atm. abs. | 24 hours in air | 24 hours in air |
|---|---|---|---|---|
| Density of the pre-foamed material | 12 g./l | 12 g./l | 12 g./l | 12 g./l. |
| Filling of the matrix | complete | 70% | complete | 70%. |
| Shaping conditions | 15 sec. 2.2 atm. abs. | 10 sec. 1.9 atm. abs. | 15 sec. 2.2 atm. abs. | 10 sec. 1.9 atm. abs. |
| Density of the shaped articles | 12 g./l | 8 g./l | >12 g./l | >8 and <12 g./l. |
| Remarks | No shrinking | No shrinking | Marked shrinking and deformation. | Marked shrinking and deformation. |

EXAMPLE IV

Pre-foamed polystyrene beads having a density of 11 grams per liter were first air-aged at atmospheric pressure for 2 hours and subsequently at an air pressure of 5 atms. abs. for 2 hours, after which they were again expanded by heating with steam. The beads, the density of which was 5 grams per liter, were then subjected for 1 hour to a monochlorodifluoromethane pressure of 4 atms. abs. After the pressure had been released the beads were placed in a closed mold and heated therein with steam for 20 seconds, at a pressure of 1.7 atms. abs. The shaped article obtained had a good appearance and no shrinking phenomena.

When a monochlorodifluoromethane pressure of only 2 atms. abs. was applied the method otherwise being the same, it was found that the shaped article obtained exhibited slight shrinking, but this could be eliminated by heating the shaped article in air for 1 hour at 50° C.

EXAMPLE V

Expandable polystyrene globules containing approximately 6% by weight of pentane were pre-foamed with steam at 100° C. for 15 minutes. The globules thus pre-foamed, which had a bulk density of 11 grams per liter, were first air-aged at atmospheric pressure for 2 hours and then subjected to an air pressure of 7 atm. abs. in an autoclave for 2 hours. After this pressure treatment, the pressure was released and the aged pre-foamed globules were subjected to a second pre-expansion by heating them with steam for 4 minutes at 100° C. This reduced the bulk density to 5.5 grams per liter.

Pre-foamed polystyrene globules manufactured in the same way, except that after the first pre-expansion they were aged at atmospheric pressure only, had a bulk density of 7 grams per liter.

In both cases (i.e., with the material having a bulk density of 5.5 grams per liter and of 7 grams per liter) shrinking was found during shaping and satisfactory articles could not be manufactured. When, however, the said pre-foamed materials were again subjected to a pressure treatment no shrinking phenomena occurred during shaping and shaped articles were obtained having good mechanical properties and appearance.

I claim as my invention:

1. A process for producing a gas-expanded, cellular polystyrene body having closed cells, comprising expanding particles of polystyrene having a vaporizable liquid $C_4$ to $C_5$ paraffin hydrocarbon inflating agent incorporated therein, whereby discrete expanded particles of reduced density are formed, aging said particles at substantially atmospheric pressure and ambient temperature for about 1 to 3 hours, subjecting the aged pre-expanded particles to superatmospheric air pressure of about 2 to 8 atmospheres for from 2 to 8 hours while maintaining the particulate state of the particles, releasing said superatmospheric pressure, and within five hours thereof converting said particles into said cellular polystyrene articles by heating in a closed mold.

2. A process according to claim 1 wherein the pressure at the end of the super-atmospheric pressure treatment is greater than at the start of said treatment.

3. A process for producing a gas-expanded, cellular thermoplastic body having closed cells, comprising expanding particles of thermoplastic polymer having a vaporizable liquid inflating agent incorporated therein, whereby discrete expanded particles of reduced density are formed, aging said particles at substantially atmospheric pressure and ambient temperature for at least 1 hour, subjecting the aged pre-expanded particles to superatmospheric gas pressure in excess of about 1.5 atmosphere for at least one hour while maintaining the particulate state of the particles, releasing said superatmospheric pressure, and within twelve hours thereof converting said particles into said cellular thermoplastic articles by heating in a closed mold.

References Cited in the file of this patent

UNITED STATES PATENTS

| | | |
|---|---|---|
| 2,787,809 | Stastny | Apr. 9, 1957 |
| 3,013,996 | Pollard et al. | Dec. 19, 1961 |
| 3,056,753 | Fronko | Oct. 2, 1962 |

OTHER REFERENCES

Koppers booklet: Technical Manual, Dylite, Expandable Polystyrene, "Storage and Transfer of Pre-Expanded Beads," Bulletin C–9–273, chapter 3c, No. 15, 1959, all pp.

BASF booklet: "New Methods for the Fabrication of Styroper," by I. F. Stastny (reprinted from "Der Plastverarbeiter 7, 242–250 (1955), pp. 4–8.